United States Patent [19]
Ohmi

[11] Patent Number: 5,058,616
[45] Date of Patent: Oct. 22, 1991

[54] METHOD OF SUPPLYING ULTRAHIGH PURITY GAS

[76] Inventor: Tadahiro Ohmi, 1-17-301 Komegabukuro, 2-chome, Sendai-shi, Miyagi-ken 980, Japan

[21] Appl. No.: 554,732

[22] Filed: Jul. 18, 1990

Related U.S. Application Data

[62] Division of Ser. No. 194,569, filed as PCT JP87/00466 on Jul. 3, 1987, abandoned.

[30] Foreign Application Priority Data

Jul. 3, 1986 [JP] Japan ................ 86-157387

[51] Int. Cl.⁵ ............................................. C23F 1/00
[52] U.S. Cl. ............................. 137/13; 156/643; 137/334
[58] Field of Search .......... 156/901, 625, 643; 137/334, 1, 13

[56] References Cited

U.S. PATENT DOCUMENTS

| | | | |
|---|---|---|---|
| 4,151,034 | 8/1979 | Yamamoto et al. | 156/643 |
| 4,169,486 | 10/1979 | Otteman et al. | 137/240 |
| 4,303,467 | 12/1987 | Scornavacca et al. | 156/643 |
| 4,383,547 | 5/1983 | Lorenz et al. | 137/240 |
| 4,565,601 | 1/1986 | Kakehi et al. | 156/643 |
| 4,615,352 | 10/1986 | Gibot | 137/7 |
| 4,676,865 | 6/1987 | DeLarge | 156/643 |

FOREIGN PATENT DOCUMENTS 54-142495 6/1979 Japan .
61-254241 11/1986 Japan .

Primary Examiner—A. Michael Chambers
Attorney, Agent, or Firm—Jeffers, Hoffman & Niewyk

[57] ABSTRACT

This invention relates to a method of and a system for supplying ultrahigh purity gas to a process device operated under reduced pressure. The first invention is a method of supplying ultrahigh purity gas comprising the steps of heating, in non-operation of the process device for effecting film making or etching under reduced pressure, a pipe line for supplying ultrahigh purity gas into said device at least for a prescribed period of time for the purpose of exhausting the ultrahigh purity gas from said pipe line, and stopping said heating of said pipe line in operation of said device and supplying the ultrahigh purity gas from said pipe line into said device via an introduction inlet of said device. The second invention is a system for supplying ultrahigh purity gas including a piping system composed of a pipe line communicating between a gas introduction inlet of the device serving to effect film making or etching under reduced pressure and a source of ultrahigh purity gas, a mechanism provided frontally of the gas introduction inlet of said device for exhausting foreign gases existent in the piping system to the outside thereof, and a mechanism for heating at least part of said pipe line extending to said gas introduction inlet.

12 Claims, 2 Drawing Sheets

METHOD OF SUPPLYING ULTRAHIGH PURITY GAS

This is a division of application as PCT JP87/00466 on Jul. 3, 1987, filed 5 Mar. 1, 1988, now abandoned.

DESCRIPTION

1. Technical Field of the Invention

The present invention relates to a system for supplying ultrahigh purity gas to a semiconductor manufacturing apparatus, etc., and more particularly to a method of and a system for supplying high purity gas to a process unit operated under reduced pressure.

2. Background Art

With recent progress of LSI technology, manufacturing apparatuses for effecting film making and etching under reduced pressure have been widely used in processes of manufacture of LSIs and ultra LSIs. There are included as these apparatuses: these for RIE(reactive ion etching), RF sputtering, RF bias sputtering, plasma CVD, ECR CVD, and ECR etching, including those such as ion sources in an ion implanting device, which utilize electrical discharge under reduced pressure, those for Si epitaxial growth, and those for CVD of various types, which utilize reactions under reduced pressure, and the like. These apparatuses employ the following various kinds of gases; Ar, Ne, $O_2$, He, $H_2$, encluding $SiH_4$, $BF_3$, $PH_3$, $SiCl_2H_2$, $Cl_2$, $CCl_4$, $SiCl_4$, $CF_4$, $BCl_3$, $CH_2F_2$, and other reactive gases, to which apparatuses high purity gas not involving any impurity at all is needed to be supplied for improving the controllability of the concerning processes and characteristics of devices formed with use of these apparatuses.

At present, substantially satisfiable gases are available by the improvement of purifying techniques for raw gases, gas cylinders filled with gases, gas purifying devices, and piping materials and parts for various gases, etc.. That is, the present inventor has accomplished a gas supply system which is free from any leakage of gas to the outside, free from dead zones, and free from particles.

This system however suffers from a problem that impurities comprising moisture in the main mix into these gases through inner wall of pipe lines serving to feed these gases to individual process units. This problem has also been substantially solved by an improved technique to treat the surface of those pipe lines and development of instruments (regulators, pressure gages and mass flow controllers) in which gas retention parts are reduced to present particles from being produced valves, and joints, but with a difficulty left behing unsolved finally: moisture, $H_2O$ adsorbed on the inner walls of the pipe lines.

In what follows, such a problem will be described, in which moisture is undesirably introduced into a chamber of the concerning device together with raw gases.

For example, mixing of $H_2O$ into Ar gas to be introduced into an RF sputtering device which serves to make a film of metal such as aluminum causes a surface of a target of Al sputtered to be oxidized with ease by the $H_2O$ involved in the atmosphere because of this surface being very active, for thereby permitting $Al_2O_3$ (alumina) to be formed on this surface. $Al_2O_3$ has a reduced rate of sputtering as compared with Al to reduce the rate of sputtering of a target and hence the speed of making a film is sharply lowered. In addition, such $H_2O$ is incorporated into the resulting Al film to result in increased Al wiring resistance as well as reduced reliablity to electromigration.

Moreover, introduction of $H_2O$ into an RIE device causes O and OH groups, which are active in the plasma environment, to be produced, whereby in etching polysilicon for example $SiO_2$ is formed on the etched surface to result in uneven etching and to prevent a selection ratio between the etched polysilicon and the underlying $SiO_2$ film from being made sufficiently large. Such a problem was solved up to now by making use of baking that is by heating a gas pipe line to about 120° C. for thereby removing $H_2O$ molecules adsorbed on the inner surface of the pipe line (this temperature 120° C. is primarily specified by the upper limit of heat resistance of a filter material).

However, the technique described above can not provide a satisfactory result particularly for a gas supply system extending to such a device as operated under reduced the pressure: in a process under gas pressure ranging from about $1 \times 10^{-4}$ to about $10^{-1}$ Torr, a flow rate of gas introduced into the device is reduced to thereby increase the degree of contamination due to gases chiefly composed of moisture and freed from the inner wall of a pipe line. Namely, with the flow rate more reduced, the degree of contamination is more increased.

In view of the drawbacks of the prior arts, it is an object of the present invention to provide a method of and a system for supplying ultrahigh purity gas capable of supplying ultrahigh purity gas to a device operated under reduced pressure.

DISCLOSURE OF INVENTION

The first invention of the present application is adapted to heat, upon non-operation of a film making or etching apparatus operable under reduced pressure, a pipe line serving to supply ultrahigh purity gas to that apparatus at least for a prescribed period of time while exhausting the ultrahigh purity gas from the pipe line to the outside, and further adapted to stop, upon operation of the aforementioned apparatus the heating of the pipe line and supply ultrahigh purity gas from the pipe line into the apparatus via an introduction inlet of the apparatus.

Furthermore, the second invention of the present application is adapted to include a piping system composed of a pipe line communicating between a gas introduction inlet of an apparatus serving to effect film making or etching under reduced pressure and a source of ultrahigh purity gas, a mechanism provided frontally of the gas introduction inlet of the aforementioned apparatus for exhausting any gas existent in the piping system to the outside, and a mechanism for heating at least part of the pipe line extending to the gas introduction inlet.

Figure 1:
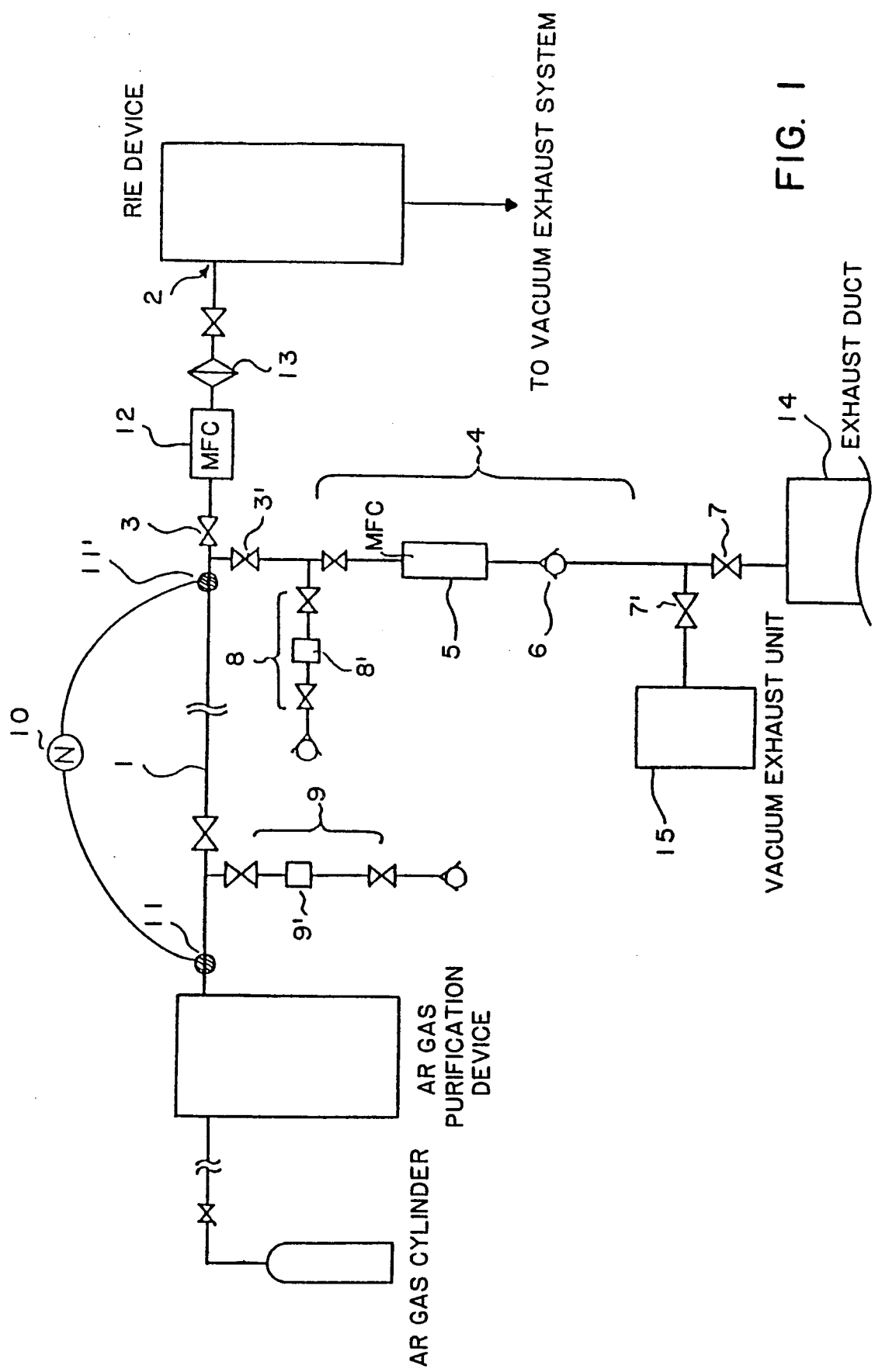
FIG. 1 is a schematic illustrating a first embodiment of a piping system according to the present invention.

Moreover, in the drawings, 1, 4, 8, and 9 are stainless pipes; 3, 3', 7, 7', 202 and 203 are valves; 6, 12 are mass flow controllers and 8', 9' are dew indicators.

DESCRIPTION OF THE PREFERRED EMBODIMENT

In what follows, embodiments of a piping system according to the present invention will be described.

Referring here to FIG. 1, which illustrates an embodiment of a piping system of the present invention, a system for supplying Ar gas to an RF bias sputtering device is exemplarily shown. The piping system according to the present embodiment is indicated by heavy lines.

Ar gas from a purification device is fed to a gas introduction inlet 2 of an RF sputtering device through a pipe line 1. Three-way valves 3, 3' and a branch pipe line 4 are provided directly before the gas introduction inlet. The branch pipe line 4 includes a mass flow controller 5 and a check valve 6. Part of the Ar gas is allowed to flow through the pipe line 4, and is exhausted to the atmosphere via an exhaust duct 14 or fed to a vacuum exhaust system 15 by changing over three-way valves 7, 7'. In addition, branch pipe lines 8, 9 include dew indicators 8', 9' respectively mounted there on for monitoring the concentration of $H_2O$ involved in the gas, and further include a valve to monitor it at need.

Moreover, designated at 10 is a power source connected to the pipe line 1 via contacts 11, 11'. In addition, designated at 12 is mass flow controller for regulating the flow rate of gas introduced into the RF sputtering device, and 13 is a ceramic gas filter for example.

In succession, the usage of this piping system will be described.

First, with the RF sputtering device not operated, the valves 3, 7' are closed while the valves 3', 7 being opened for exhausting Ar gas at all times through the pipe lines 1, 4 to the atmosphere. Thereupon, the master controller 5 is adjusted to regulate the flow rate of the Ar gas.

In addition, a current is conducted through the pipe line 1 from the power source 10 to thereby raise temperature of the pipe line owing to Joule effect. The pipe line is rendered in such a manner to baking at all times to free involved foreign gases to the outside of the piping system for thereby removing $H_2O$ adhering to the inner wall of the pipe line. The flow rate of the gas in this case is set to about 1 to 2 l/min for example, and temperature of the gas is set to range from about 100° to about 200° C. in view of the limit of heat resistance of constituent parts for use in the piping system. Assuming here for example that the pipe line 1 is a stainless one having a diameter of ¼ inch and that the flow rate of the Ar gas or $N_2$ gas ranges from about 1 to about 2 l/min, those gases and the piping system can be heated to about 200° C. by conducting a current of about 60 A.

Then, with the sputtering device operated, the power source 10 is turned off to return the temperature of the piping system to room temperature. In succession, the valve 3' is closed while the valve 3 is opened to feed the Ar gas into the RF sputtering device. There upon the master flow controller 12 is adjusted to regulate the flow rate of the gas flowing into the sputtering device. The flow rate of the gas at that time typically ranges from about several cc/min to about 10 cc/min, and the chamber of the sputtering device is operated under reduced pressure of from $10^{-5}$ to $10^{-2}$ Torr.

The reason why the valve 3' was opened to separate the branch pipe 4 is as follows:

Provided that the valve 3 is opened to supply the Ar gas to the sputtering device and simultaneously the valve 3' is also opened to exhaust the Ar gas at the flow rate of from about 1 to 2 l/min from the exhaust dust 14 to the atmosphere, the sputtering device is operated at low gas pressure, and hence the piping system is also more reduced commonly than normal pressures. Thus, in order to prevent thereupon a back-flow of the concerning gas from the atmosphere, the valve 3' is closed.

This piping system can also be employed as follows; upon operating the present system the valve 3 is opened to supply Ar gas to the sputtering device and simultaneously the valve 3' is also opened to exhaust the Ar gas. Thereupon, the valve 7 is closed and the valve 7' is opened to permit the Ar gas to flow to the side of the exhaust unit. When the pressure inside the pipe line 4 on the exhaust side is also lowered to about $10^{-2}$ Torr in such a manner to balance that in the sputtering device, the back-flow of the gas can be prevented, and in addition the flow rate of the Ar gas through the pipe line 1 can be kept constant at all times to further reduce the ratio of mixing of contaminated gas from the inner wall of the piping system into the piping system and the Ar gas.

In the following, the reason why the concerning gas can be supplied to the respective process devices through the pipe lines while keeping the gas at high purity will be described.

To begin with, why a prior pipe line permits much moisture to mix into the concerning gas will be described. It was usual in many prior inventions to supply the concerning gas from the purification device only through the pipe line 1 without use of the branch pipe 4 as in the present invention. Accordingly, when the process device is not operated, the gas was kept restricted in the pipe line. Thereupon, moisture adsorbed on the inner wall of the gas piping system mixes into the gas continuously. Since the amount of the moisture freed from the inner wall and mixed into the gas is substantially kept unchanged, a ratio of the moisture involved in the gas to this gas is increased as the flow rate of the gas is decreased. Execution of such a gas piping system is usually conducted in the atmosphere and thereupon a large quantity of moisture is adsorbed on the inner wall of the piping system. With the inner wall of the piping system covered with many water molecules, those molecules are entrained by the high purity gas into the process device to result in various problems as described above. It is therefore very important never to permit those water molecules to be adsorbed on the pipe wall, and to rapidly exhaust those molecules, if adsorbed thereon, to the outside of the piping system.

The piping system according to the present invention is adapted to permit Ar gas to flow through the pipe line in a sufficiently high flow rate (e.g., from 1 to 3 l/min) at all times in non-operation of the process device, and further to permit water molecules adsorbed on the pipe wall to be gradually freed by making use of heat produced on the pipe line because this pipe line can be heated from the power source and then to be rapidly exhausted while entrained by a stream of the gas to the outside of the system. Accordingly, with a small flow rate of the Ar gas supplied to the process device upon operation thereof, high purity gas can be supplied since almost all the moisture adsorbed on the pipe wall has been removed. Furthermore, the piping system of the present invention is also adapted to permit the Ar gas to flow through the pipe line in an equally high flow rate (e.g., from 1 to 2 l/min) at all times, and to permit only a small flow rate in need of the associated process (several cc/min–several tens of cc/min) to be introduced into the process device with all the remaining gas being exhausted (the valves 3, 3', and 7' opened, and the valve 7 closed in FIG. 1). Such usage of the piping system enables the ratio of foreign gas freed from the pipe wall and mixed into the pure gas to this pure gas to be further reduced and furthermore high purity gas to be supplied.

This is the reason why the system of the present invention can supply high purity gas to the respective process devices keeping the purity thereof high when it goes out of the gas purification device. For example, an RF sputtering device for Ar can assure high speed film making as well as high quality Ar wiring. Moreover, in the RIE device for example, uniformity of etching thereof has been sharply improved together with the improvement of the rate of the etching as well as the ratio of selection between $Si/SiO_2$.

In addition, in the embodiment shown in FIG. 1, the branch pipes 8, 9 provided with the dew indicators were prepared for monitoring dew points of gases flowing through the vicinities of the outlet of the purification device and the inlet 2 of the sputtering device. For example, when the sputtering device is not employed over a long period of time, the following usage is also possible: exhaustion of Ar gas to the atmosphere is temporarily stopped, and heating of the piping and the exhaustion of the gas through the branch pipe 4 are again effected prior to re-operation of the device to cause readings of the dew indicators 8' and 9' to become equal to each other and after this gas supply to the sputtering device is started. This is effective for devices employed infrequently in view of economizing Ar gas. It is however a matter of course that these pipe lines 8 and 9 can be omitted without departing from the scope of the present invention.

In addition, although the method to directly conduct a current through the pipe line was described as means to heat the pipe line, another method, e.g., a prior method of winding a heater around the pipe line to heat it may also be employed. Furthermore, any other means may be employed too.

Successively, a second embodiment of the piping system according to the present invention will be described with reference to the illustration of FIG. 2, in which the piping system of the present invention is emplyed to supply specific reactive gases ($SiH_4$, $BF_3$, $PH_3$, $SiCl_2$, $Cl_2$, $CCl_4$, $SiCl_4$, $CF_4$, $BCl_3$, $CH_2F_2$ and the like) to the RIE device for example. The common numbers in FIG. 2 to those in FIG. 1 designate the same portions. In this second embodiment specified gas 201 needed in the RIE device and Ar gas for purging the pipe line are connected respectively to the three-way valves (202,203). When the RIE device is not employed, the valve 202 is closed with 203 opened, and then the Ar gas is exhausted through the pipe line 4 in conformity with the same procedure as in the first embodiment. Upon use of the RIE device, the valve 203 is closed with 202 opened to supply the specific gas to the RIE device. The valve 3 is of course opened at this time. The same method as in the first embodiment may be employed in quite the same manner: the valve 3' may be closed or the same valve 3' may be opened to exhaust the specific gas to the vacuum exhaust unit.

The second embodiment can supply high purity specific gas to the process device based upon the same reason as in the first embodiment. Although hereupon Ar was employed as the gas for purging the pipe line, $N_2$ gas may be employed for that purpose. In addition, other gases may be employed at need.

Figure 2:
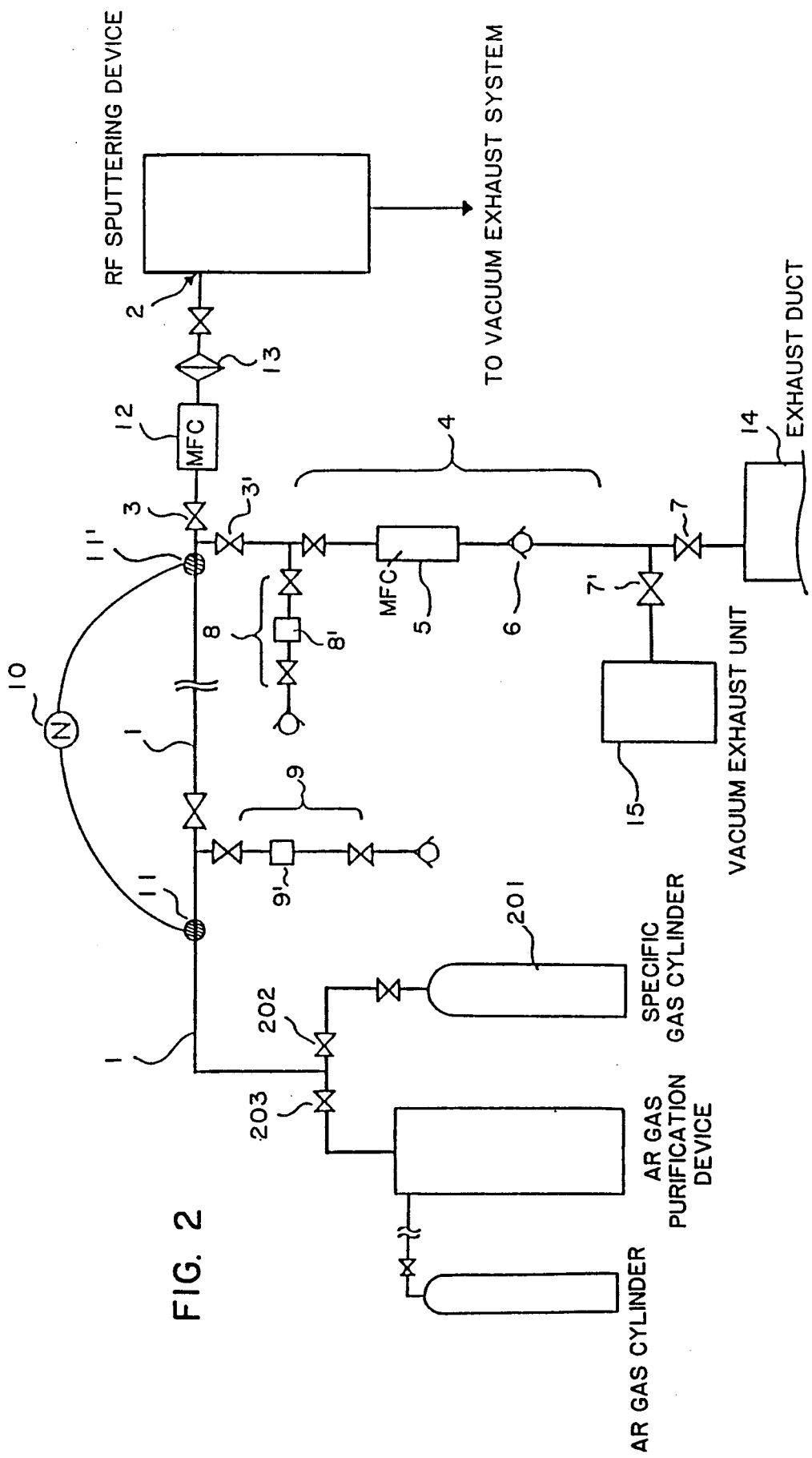
FIG. 2 is a block diagram illustrating a second embodiment of the piping system according to the present invention.

Although the present invention was described by way of the embodiments as stated above, the arrangement of the piping system may be modified, without limitation to those illustrated in FIGS. 1 and 2, to employ additional valves and instruments, etc., or to eliminate unnecessary elements in conformity with respective purposes. Moreover, although only the RF sputtering device and the RIE device were described here, it is a matter of course that the same arrangement as in those devices can be applied to any device listed in the "Background of Art".

According to the present invention, as described above, any impurity, particularly $H_2O$ can be removed to the extremity from the gas supplied to the process device to greatly improve stability of film making and etching as well as reliability of devices formed with use of the present system.

Although certain preferred embodiments have been shown and described, it should be understood that many changes and modifications may be made therein without departing from the scope of the appended claims.

I claim:

1. A method for supplying ultrahigh purity gas from a source for said ultrahigh purity gas through a piping system to process equipment of the type used for film making or etching under reduced pressure, said piping system extending between the source for said ultrahigh purity gas and an inlet to said process equipment, and including exhaust means for selectively discharging said gas from said system comprising:

heating at least a portion of said piping system for a predetermined length of time;

passing a purge gas through at least a portion of said piping system for a predetermined length of time, and discharging said purge gas from the piping system;

eliminating the heat from the system; and passing a process gas through said piping system to said process equipment.

2. A method for supplying ultrahigh purity gas as described in claim 1 wherein a portion of said process gas is discharged out of the piping system without passing through said process equipment when said process gas is supplied to said process equipment.

3. A method for supplying ultrahigh purity gas as described in claim 2, wherein said purge gas is the same as said supply gas.

4. A method for supplying ultrahigh purity gas as described in claim 2, wherein said purge gas is not the same as said supply gas.

5. A method for supplying ultrahigh purity gas as described in claim 1, wherein said purge gas is the same as said supply gas.

6. A method for supplying ultrahigh purity gas as described in claim 1, wherein said purge gas is not the same as said supply gas.

7. A method to supply ultrahigh purity gas, supplying ultrahigh purity process gas through piping and inlet from the source of ultrahigh purity gas to the process equipment, where film forming or etching is performed under reduced pressure, wherein the purge gas is flown through said piping to discharge it out of said piping while heating the piping at least for a certain period when said process gas is not supplied to said process equipment, and the heating of said piping is stopped when said process gas is supplied to said process equipment.

8. A method to supply ultrahigh purity gas as set forth in claim 7, wherein a part of said process gas is discharged out of the piping without passing through said process equipment when said process gas is supplied to said process equipment.

9. A method for supplying ultrahigh purity gas as described in claim 8, wherein said purge gas is the same as said supply gas.

10. A method for supplying ultrahigh purity gas as described in claim 8, wherein said purge gas is not the same as said supply gas.

11. A method for supplying ultrahigh purity gas as described in claim 7, wherein said purge gas is not the same as said supply gas.

12. A method for supplying ultrahigh purity gas as described in claim 7, wherein said purge gas is the same as said supply gas.

* * * * *